(12) United States Patent
Seethaler et al.

(10) Patent No.: US 8,539,246 B2
(45) Date of Patent: *Sep. 17, 2013

(54) SECURE RESUME FOR ENCRYPTED DRIVES

(75) Inventors: Kenneth S. Seethaler, Wake Forest, NC (US); Randall S. Springfield, Chapel Hill, NC (US); Howard Locker, Cary, NC (US); Joseph M. Pennisi, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 139 days.

This patent is subject to a terminal disclaimer.

(21) Appl. No.: 13/049,071

(22) Filed: Mar. 16, 2011

(65) Prior Publication Data

US 2012/0239939 A1 Sep. 20, 2012

(51) Int. Cl.
*G06F 21/00* (2006.01)
(52) U.S. Cl.
USPC ......................................................... 713/182

(58) Field of Classification Search
None
See application file for complete search history.

(56) References Cited

U.S. PATENT DOCUMENTS

| | | | |
|---|---|---|---|
| 2008/0184035 A1* | 7/2008 | Iyer et al. | 713/183 |
| 2009/0070593 A1* | 3/2009 | Boshra et al. | 713/186 |
| 2009/0319806 A1* | 12/2009 | Smith et al. | 713/193 |
| 2011/0126023 A1* | 5/2011 | Wang et al. | 713/182 |
| 2012/0151223 A1* | 6/2012 | Conde Marques et al. | 713/193 |
| 2012/0159041 A1* | 6/2012 | Saxena et al. | 711/103 |
| 2012/0254602 A1* | 10/2012 | Bhansali et al. | 713/2 |

* cited by examiner

*Primary Examiner* — Cordelia Zecher
(74) *Attorney, Agent, or Firm* — Ference & Associates LLC

(57) ABSTRACT

Systems, methods and products are described that provide secure resume for encrypted drives. One aspect provides a method including: receiving an indication to resume from a suspended state at a computing device; responsive to authenticating a user at one or more input devices, accessing a value in a BIOS derived from authenticating the user at the one or more input devices; responsive to accessing the value, releasing a credential for unlocking one or more encrypted drives; and thereafter proceeding to resume from the suspend state.

20 Claims, 4 Drawing Sheets

SECURE RESUME FOR ENCRYPTED DRIVES

BACKGROUND

Providing security for data in computing systems is important for many reasons, such as ensuring sensitive data is not accessible to unauthorized users. Passwords are commonly used in an attempt to secure computing systems. For example, at power on, a user may be prompted for a password prior to allowing the computing system to complete booting. Users resuming a computing system from a lower powered state, for example S3, may be prompted for a password (for example, a power-on password) prior to the computing system resuming.

With respect to the data content of drives (disks, HDDs), conventionally a password may be set for a drive itself, whereby at power on of a computing system, data of a drive of the computing system is locked, subject to authorization using the password. Thus, access to the drive contents is dependent on authentication. However, with proper equipment, even password locked drives could be removed and the data read without proper authentication. Efforts to make data on drives more secure thus lead to additional schemes, including encrypting the data on the drive so that even though the data on the drive may be accessible if the drive is removed, the data on the drive is not in a useful form (it is encrypted).

A way in which data on a drive may be encrypted is through use of a self-encrypting drive (SED). SEDs are storage devices that include embedded services for encrypting the data content of the drives. The Trusted Computing Group (TCG) specifies a standard, commonly referred to as Opal, for security regarding SEDs. SEDs operate by encrypting data written to the drive, and decrypting encrypted data read from the drive. This is done by the SED and is transparent from the user's perspective. SEDs are locked when powered off, and remain locked on power up until an authentication takes place.

Key management in SEDs is provided in the hard disk controller and authentication on power up of an SED takes place via a software pre-boot authentication environment or with a BIOS password. For example, when a computing system is powered on and requests the master boot record (MBR), the SED returns an MBR shadow, which is pre-boot code for an environment that allows the disk to unlock. The MBR shadow authenticates the user and unlocks the drive, at which point the normal boot process is resumed and the computing system's request for the MBR returns to the actual MBR, the operating system is loaded and the booting process completes. This ensures that in a power off state in which the disk is powered down, the disk protects all data contents on it because the data content, including an operating system (OS), is in an encrypted state and can not be unlocked without proper authentication.

BRIEF SUMMARY

In summary, one aspect provides a method comprising: receiving an indication to resume from a suspended state at a computing device; responsive to authenticating a user at one or more input devices, accessing a value in a BIOS derived from authenticating the user at the one or more input devices; responsive to accessing the value, releasing a credential for unlocking one or more encrypted drives; and thereafter proceeding to resume from the suspend state.

Another aspect provides a system comprising: one or more processors; one or more encrypted drives; and one or more input devices; wherein, responsive to execution of computer program instructions accessible to the one or more processors, the one or more processors are configured to: receive an indication to resume from a suspended state; responsive to authenticating a user at one or more input devices, access a value in a BIOS derived from authenticating the user at the one or more input devices; responsive to accessing the value, release a credential for unlocking the one or more encrypted drives; and thereafter proceed to resume the system from the suspend state.

A further aspect provides a computer program product comprising: a computer readable storage medium having computer readable program code embodied therewith, the computer readable program code comprising: computer readable program code configured to receive an indication to resume from a suspended state at a computing device; computer readable program code configured to, responsive to authenticating a user at one or more input devices, access a value in a BIOS derived from authenticating the user at the one or more input devices; computer readable program code configured to, responsive to accessing the value, release a credential for unlocking one or more encrypted drives; and computer readable program code configured to thereafter proceed to resume from the suspend state.

The foregoing is a summary. For a better understanding of example embodiments, together with other and further features and advantages thereof, reference is made to the following description, taken in conjunction with the accompanying drawings, and the scope of the claimed embodiments will be pointed out in the appended claims.

DETAILED DESCRIPTION

Figure 1:
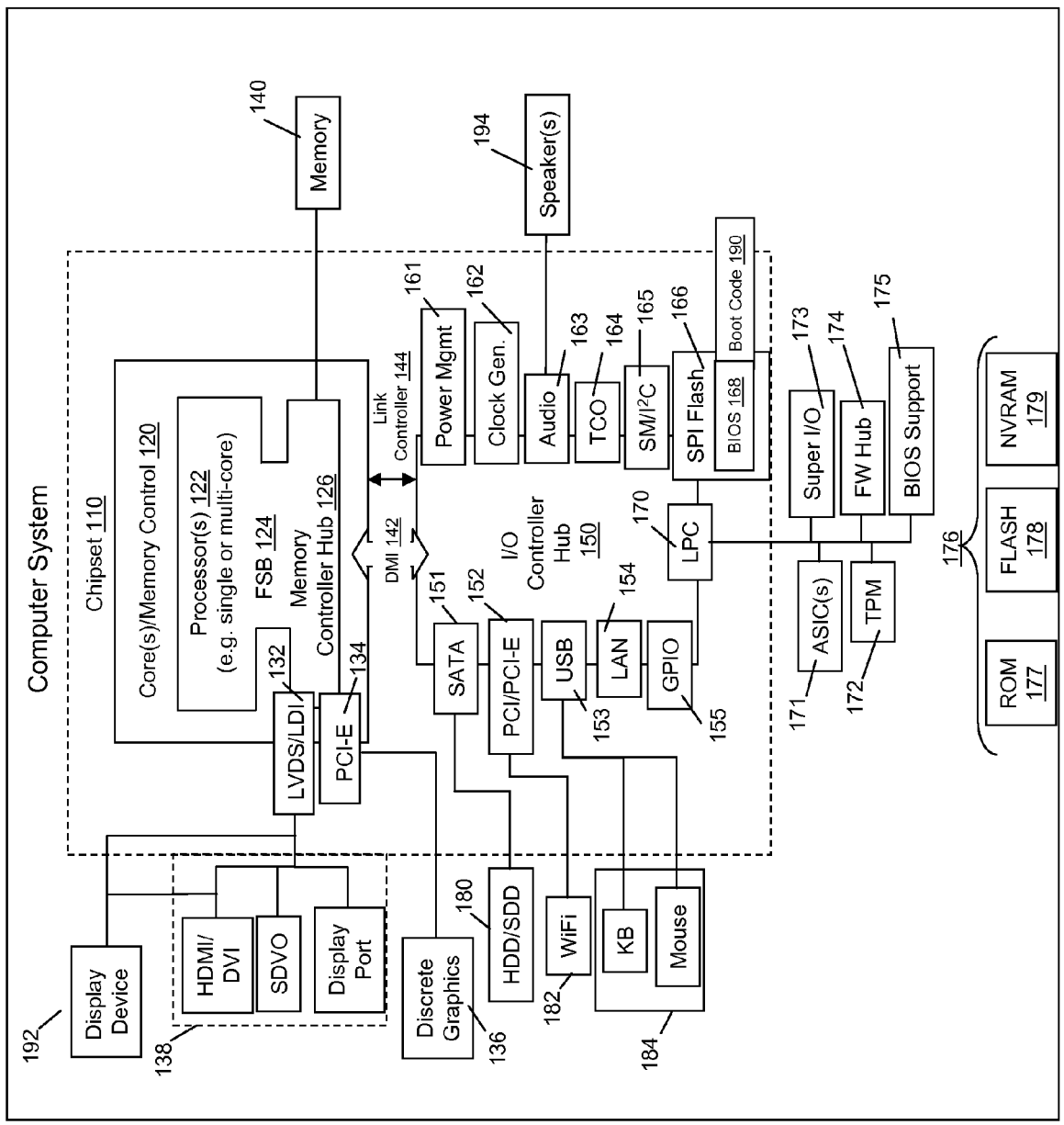
FIG. 1 illustrates an example circuitry of a computer system.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, wellknown structures, materials, or operations are not shown or described in detail to avoid obscuring aspects of the invention.

Using a pre-boot authentication environment, as described herein, in which user authentication allows the drive to be unlocked at power up creates problems for users attempting to come out of a suspend or low power state where RAM is powered (that is, in suspend state/sleep state/S3 state). This is because the pre-boot environment is not recreated, and BIOS will not have the password for unlocking the drive. This requires forcing the computing system into an alternate power state (for example, S4 or S5) to allow the drive to unlock (allow shadowing the MBR). Forcing the computing system into an alternate power state is undesirable because it adds time to resume operations (takes away quick resume capability).

The TCG is considering a solution to forcing the computing system into an alternate power state wherein the drive can resume from a suspended state and accept a credential (to unlock the drive) without shadowing the MBR. The solution involves, during the pre-boot environment (power up), establishing an alternate credential that BIOS can later use to unlock the drive (for example, upon resume from S3 state). For example, this alternate credential could be established by BIOS or established by the pre-boot environment and later passed to BIOS. The alternate credential could be stored in memory (for example, in the system management interrupt (SMI) handler). The alternate credential is established to protect the original credential, which is not released. Upon resume (for example, for S3 state) the BIOS automatically sends the alternate credential created during the initial pre-boot process to the drive for unlocking the drive.

A problem with this solution is that once the alternate credential is established an unauthorized user could capture the alternate credential for use. This amounts to having the security level reduced to that of protecting a drive with a password because once the alternate credential is established, the drive could be removed, and the data could be read (and decrypted) upon supplying the alternate credential to the drive. A further problem is that the BIOS automatically sends the alternate credential to the drive upon resume which makes the credential easy to be captured.

Accordingly, embodiments provide additional security prior to release of a credential allowing resume (for example, from S3 state). As an example, an embodiment uses a device to ensure that the user attempting to resume a computing system is an authorized user prior to releasing a credential for unlocking an encrypted drive. The device outputs a value that allows BIOS to release a credential allowing resume.

One embodiment utilizes a biometric device as the device that ensures the user attempting to resume the computing system is an authorized user. As a non-limiting example of such a biometric device, an embodiment using a fingerprint reader (FPR) is described herein. Those having ordinary skill in the art will readily appreciate that other means for authenticating may be employed. For example, other embodiments may utilize a smart card and smart card reader, entry of a password, utilization of voice recognition, utilization of a visual authentication (such as VERIFACE device) or other means to accomplish this authentication functionality. However, it is worth noting that more complex authentication means may require more memory, which can in some cases be constrained as BIOS typically has only limited memory available in a resume environment. VERIFACE is a registered trademark of Lenovo (Beijing) Limited Corp. in the United States and other countries.

The illustrated example embodiments will be best understood by reference to the figures. The following description is intended only by way of example, and simply illustrates certain example embodiments.

While various other circuits, circuitry or components may be utilized, FIG. 1 depicts a block diagram of one example of computing system circuits, circuitry or components. The example depicted in FIG. 1 may correspond to computing systems such as the THINKPAD series of personal computers sold by Lenovo (US) Inc. of Morrisville, N.C. However, as is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for input devices 184 such as a digitizer, keyboard, mice, cameras, phones, storage, other connected devices, et cetera.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
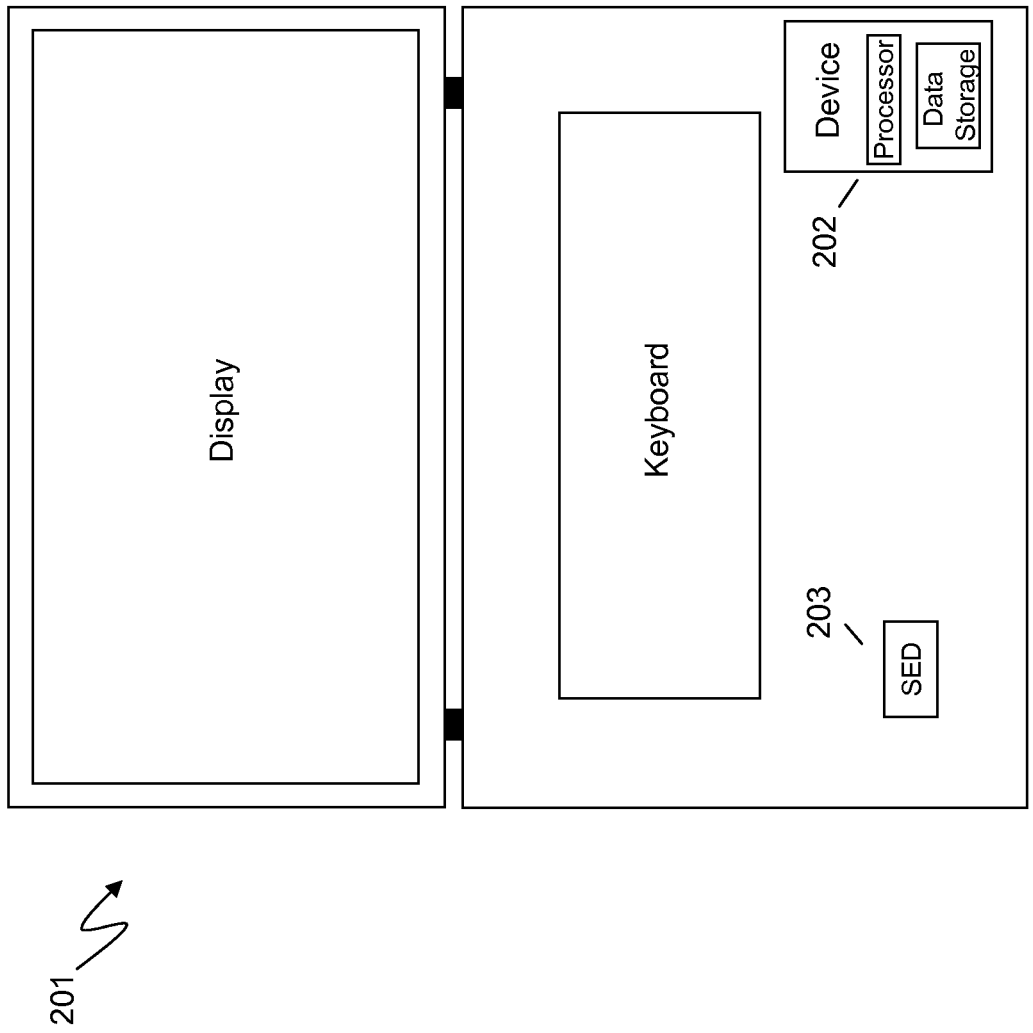
FIG. 2 illustrates an example system for secure resume.

FIG. 2 illustrates an example system for authenticating a user prior to allowing resume from a suspend state. The system 201 may include components such as those illustrated in FIG. 1, and may include one or more encrypted HDDs, such as a SED 203. The system 201 uses an input device 202 (FPR in this example) to ensure that the user attempting to resume is an authorized user prior to release of a credential for unlocking an encrypted drive. The FPR 202 outputs a value that allows BIOS to release a credential allowing resume. The credential released may be for example the alternate credential, as discussed herein. The FPR may be a sub-system including its own processor and (secure) data storage unit/memory.

In the example case of where a FPR 202 is utilized as the input device, the FPR 202 may indicate that it is ready to accept input. This indication may include for example a light being lit on the FPR 202, which may happen upon a resume attempt.

The example system 201 is configured to employ the SED 203. In a first boot-up, the pre-boot environment including MBR shadowing authorizes the user and sets up an alternate credential. As described herein, the alternate credential may be predetermined by the BIOS and communicated to the pre-boot environment, or created by the pre-boot environment and sent to the BIOS, or some other mechanism may be used, so long as an alternate credential is established and made available to the BIOS. Once the boot process has completed and an OS loaded, the user may utilize the system 201 as desired. When the system 201 is placed into a suspend state, such as S3, FPR 202 is utilized to authenticate the user prior to permitting release of the alternate credential (BIOS unlocking the SED 203).

Figure 3:
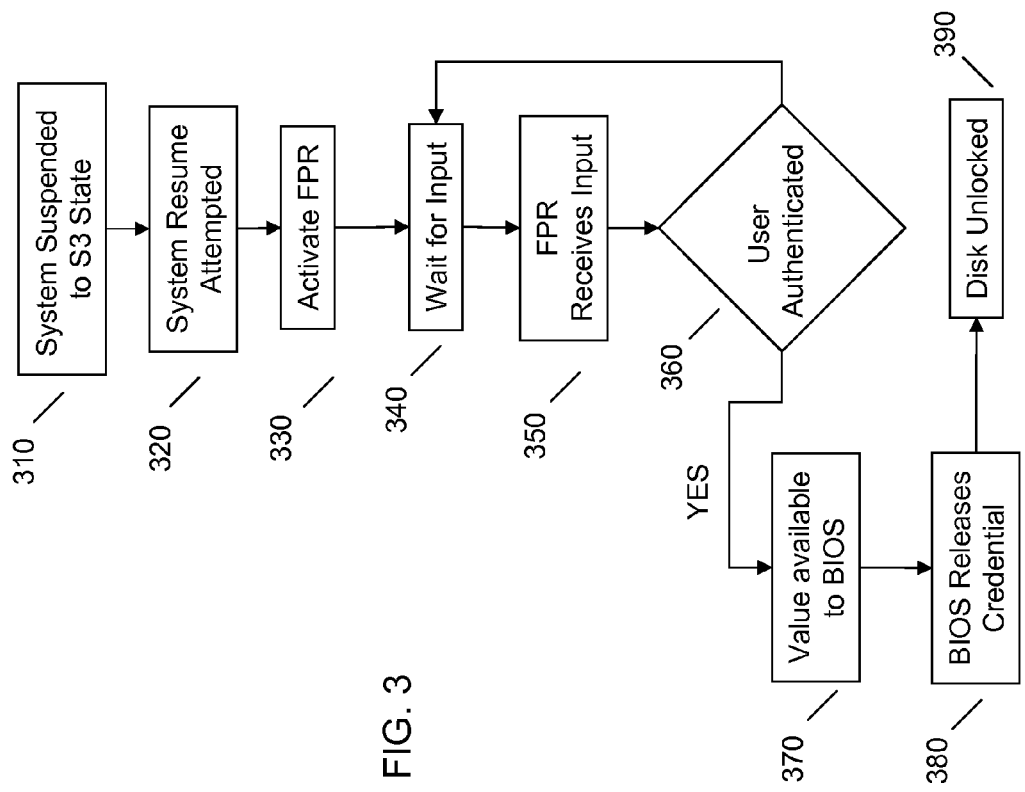
FIG. 3 illustrates an example method for secure resume.

Referring to FIG. 3, an example method for authorizing a user upon resume is illustrated. When the system 201 enters a system suspend state 310, such as S3, the user places the system 201 in a lower powered state from which the system 201 can be quickly resumed. For example, a user places a laptop in the S3 state by closing the lid of the laptop. From this state, the user can resume the system 201 quickly because content remains in powered memory.

Conventionally, as described herein, when attempting to resume 320 the system 201, either the system 201 must be placed into an alternate power state; or, the contents of the SED 203 are available for access, as the TCG proposed solution provides BIOS with an alternate credential for automatic resumption. These are unsatisfactory approaches, amounting to delaying the resume, or having BIOS automatically release an alternate credential upon resume, respectively.

However, in an embodiment, responsive to an attempt to resume 320 the computing system 201, a FPR 202 is activated 330. Alternately, it is possible that the FPR 202 remains active in the S3 state. The activated FPR 202 waits for input 340. Responsive to the FPR 202 receiving input 350, the user is authenticated 360.

The FPR 202 authenticates the user attempting to resume. For example, the FPR 202 may be initialized for one or more users and have biometric input (finger slide) associated with one or more user passwords. For example, a first user's finger may be associated with password 1, whereas a second user's finger may be associated with passwords 1, 2 and 3. If the user attempting to authenticate to the FPR 202 provides a finger slide that matches the initialized finger slide, as calculated by the FPR 202, the associated password(s) are released. In similar fashion, the value may be released by the FPR 202.

If authentication fails, the attempt to resume the system 201 fails. For example, at this point the FPR 202 can again wait for input 340. If the user is authenticated, the FPR 202 makes available the value to the BIOS (SMI handler) at 370. Responsive to BIOS obtaining the value, BIOS releases a credential 380 and the SED 203 is unlocked 390, which allows the system 201 to resume.

The value sent by the FPR 202 may be a simple value, such as an indication that the user has been authenticated. However, the value may be more complex, for example indicating that the user has been authorized by the FPR 202, and that the FPR 202 is the proper FPR 202 for the system 201. This prevents replacing the FPR 202 on the system to allow release of the credential from BIOS. Also, the value sent to BIOS may be the credential (or alternate credential) itself, may be a value that can be used to calculate the credential (or alternate credential), may be a hash of the value, or may be an independent value that instructs BIOS that it is safe to release the credential (or alternate credential). Therefore, the value sent to BIOS functions to ensure that the environment in which BIOS releases the credential is ensured to be an environment where an authorized user is present.

Figure 4:
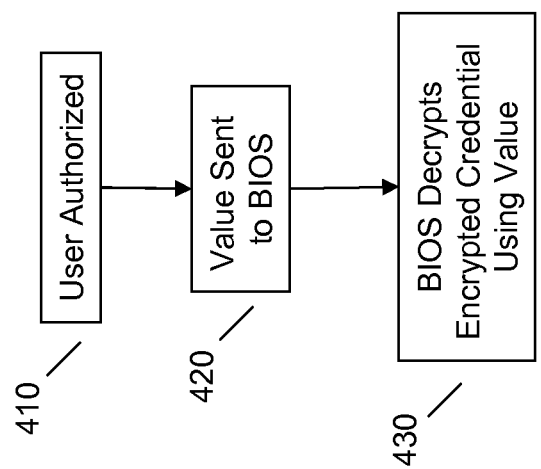
FIG. 4 illustrates an example method for securing a resume credential.

Referring to FIG. 4, the credential (or alternate credential) stored by BIOS (for example, in the SMI handler) may be stored in a secure form (such as an encrypted form) to prevent cold-boot attacks. The cold-boot attack relies on a property of memory (DRAM) in which bits of data take minutes to disappear after removal of power. The disk encryption key(s) or credentials, conventionally maintained in memory in pure, (non-secure) unencrypted form, can therefore be recovered after power loss. As a countermeasure, the value provided by the biometric device 202 can be used, for example, to decrypt the credential (or alternate credential).

Therefore, responsive to a user being authenticated 410, such as via a FPR 202, the value is sent to BIOS at 420. BIOS may then utilize the value to decrypt the credential 430. This allows BIOS to pass the decrypted credential to the drive for unlocking Encryption with the value is a non-limiting example, and those having ordinary skill in the art will readily appreciate that there are other means of securing the credential. For example, to prevent bus sniffing, the value released by the FPR 202 could be a hash of a value (for example, a hash of the actual (or alternate) credential stored by BIOS). The actual (or alternate) credential may be stored in the system memory, and could be encrypted. The SMI handler could decrypt and hash the stored, actual (or alternate) credential and compare the hash received from the FPR 202. If these agree or match, then the disk could be unlocked.

Embodiments may be implemented in one or more computing devices configured appropriately to execute program instructions consistent with the functionality of the embodiments of the invention as described herein. In this regard, FIG. 1 describes a non-limiting example of such a computing device. While mobile computing systems such as laptop computers have been specifically mentioned as examples herein, embodiments may be implemented using other computing systems, such as desktops, workstations, servers, smartphones, slates, tablets, and the like.

As will be appreciated by one skilled in the art, various aspects may be embodied as a system, method or computer program product. Accordingly, aspects may take the form of an entirely hardware embodiment or an embodiment including software and/or hardware aspects that may all generally be referred to herein as a "circuit," "module" or "system." Furthermore, aspects may take the form of a computer program product embodied in one or more computer readable medium(s) having computer readable program code embodied thereon.

Any combination of one or more non-signal computer readable medium(s) may be utilized. The non-signal computer readable medium may be a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of a computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented at least in part by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

The computer program instructions may also be stored in a computer readable medium that can direct a computer, other programmable data processing apparatus, or other device(s) to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device(s) to cause a series of operational steps to be performed on the computer, other programmable apparatus or other device(s) to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying drawings, it is to be understood that this description is not limiting and that various other changes and modifications may be affected therein by one skilled in the art without departing from the scope or spirit of the disclosure.

What is claimed is:

1. A method comprising:
   in a boot process at a computing device, setting up an alternate credential in a pre-boot environment, wherein the pre-boot environment includes master boot record shadowing;
   after the boot process, receiving an indication to resume from a suspended state at the computing device;
   responsive to authenticating a user at one or more input devices, accessing a value in a BIOS derived from authenticating the user at the one or more input devices;
   responsive to accessing the value, releasing the alternate credential for unlocking one or more encrypted drives; and
   thereafter proceeding to resume from the suspend state.

2. The method according to claim 1, wherein the one or more input devices comprise a biometric device.

3. The method according to claim 1, wherein the one or more input devices comprise a fingerprint reader.

4. The method according to claim 1, wherein one or more input devices comprise a smart card reader.

5. The method according to claim 1, wherein the suspend state is S3.

6. The method according to claim 1, wherein the one or more encrypted drives comprises one or more self-encrypting drives.

7. The method according to claim 1, wherein the value derived from authenticating the user at the one or more input devices is a hash.

8. The method according to claim 7, further comprising:
   comparing a hash of the alternate credential with the hash of the value derived from authenticating the user at the one or more input devices;
   wherein said releasing the alternate credential for unlocking an encrypted drive occurs responsive to a match between the hash of the alternate credential and the hash of the value derived from authenticating the user at the one or more input devices.

9. The method according to claim 1, wherein the alternate credential is stored in a secure form.

10. The method according to claim 9, wherein the secure form is releasable using the value derived from authenticating the user at the one or more input devices.

11. A system comprising:
    one or more processors;
    one or more encrypted drives; and
    one or more input devices;
    wherein, responsive to execution of computer program instructions accessible to the one or more processors, the one or more processors are configured to:
    in a boot process at the system, setting up an alternate credential in a pre-boot environment, wherein the pre-boot environment includes master boot record shadowing;
    after the boot process, receive an indication to resume from a suspended state;

responsive to authenticating a user at one or more input devices, access a value in a BIOS derived from authenticating the user at the one or more input devices;

responsive to accessing the value, release the alternate credential for unlocking the one or more encrypted drives; and thereafter proceed to resume the system from the suspend state.

12. The system according to claim 11, wherein the one or more input devices comprise a biometric device.

13. The system according to claim 11, wherein the one or more input devices comprise a fingerprint reader.

14. The system according to claim 11, wherein the one or more input devices comprise a smart card reader.

15. The system according to claim 11, wherein the suspend state is S3.

16. The system according to claim 11, wherein the value derived from authenticating the user at the one or more input devices is a hash.

17. The system according to claim 16, wherein, responsive to execution of computer program instructions accessible to the one or more processors, the one or more processors are further configured to:

compare a hash of the alternate credential with the hash of the value derived from authenticating the user at the one or more input devices;

wherein the alternate credential for unlocking an encrypted drive is released responsive to a match between the hash of the alternate credential and the hash of the value derived from authenticating the user at the one or more input devices.

18. The system according to claim 11, wherein the alternate credential is stored in a secure form.

19. The system according to claim 18, wherein the secure form is releasable using the value derived from authenticating the user at the one or more input devices.

20. A computer program product comprising:

a computer readable storage medium having computer readable program code embodied therewith, the computer readable program code comprising:

computer readable program code configured to, in a boot process at a computing device, setting up an alternate credential in a pre-boot environment, wherein the pre-boot environment includes master boot record shadowing;

computer readable program code configured to, after the boot process, receive an indication to resume from a suspended state at the computing device;

computer readable program code configured to, responsive to authenticating a user at one or more input devices, access a value in a BIOS derived from authenticating the user at the one or more input devices;

computer readable program code configured to, responsive to accessing the value, release the credential for unlocking one or more encrypted drives; and computer readable program code configured to thereafter proceed to resume from the suspend state.

\* \* \* \* \*